M. V. PENA.
CONNECTOR AND RELEASER.
APPLICATION FILED MAY 5, 1916.
1,211,342.
Patented Jan. 2, 1917.
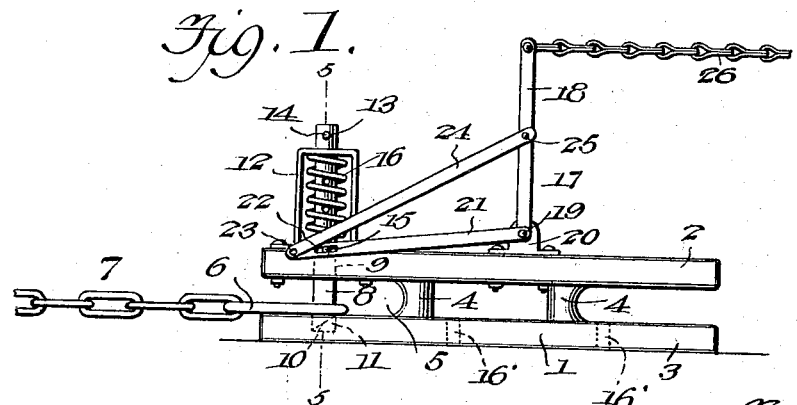
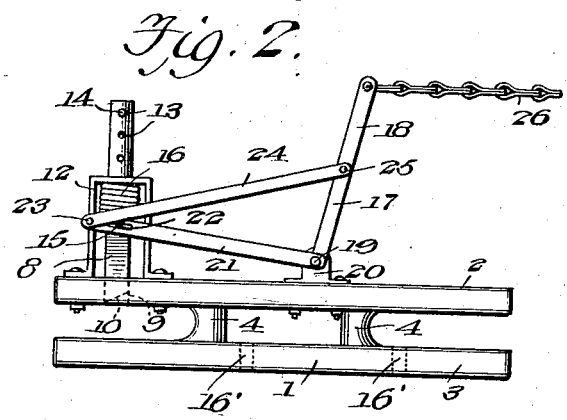
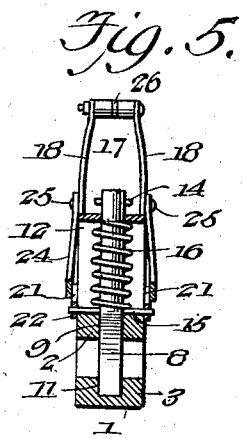
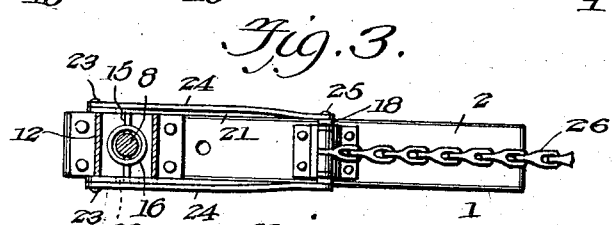
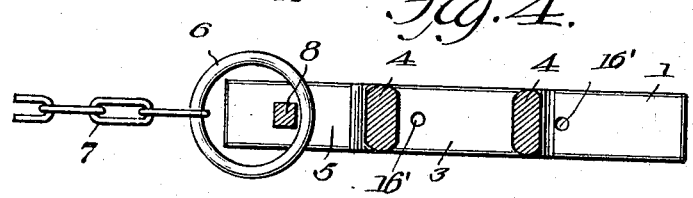
Witnesses
Hugh H. Ott
Inventor
Manuel V. Pena
By Victor J. Evans
Attorney

UNITED STATES PATENT OFFICE.

MANUEL V. PENA, OF COTULLA, TEXAS.

CONNECTOR AND RELEASER.

1,211,342.	Specification of Letters Patent.	Patented Jan. 2, 1917.

Application filed May 5, 1916. Serial No. 95,739.

*To all whom it may concern:*

Be it known that I, MANUEL V. PENA, a citizen of the United States, residing at Cotulla, in the county of Lasalle and State of Texas, have invented new and useful Improvements in Connectors and Releasers, of which the following is a specification.

This invention relates to a connector and releaser, comprehending a device by means of which parts may be coupled together in such a way as to admit of their ready disconnection or release when occasion requires.

The object of the invention is to provide a device of the character described by means of which a horse may be coupled to a vehicle, a parachute to an aircraft, or any other similar connection made in such manner that, in the event of danger, the operator may instantly operate the device to release the horse from the vehicle or release the parachute from the aircraft in order to avoid impending danger.

The invention consists of the features of construction, combination and arrangement of parts hereinafter fully described and claimed, reference being had to the accompanying drawing in which:—

Figure 1 is an elevational view of the device as employed for coupling two elements together and showing the elements in connected relation. Fig. 2 is a similar view showing the releasing action. Fig. 3 is a sectional plan view of the device. Fig. 4 is a horizontal longitudinal section through the device. Fig. 5 is a vertical transverse section on line 5—5 of Fig. 1.

In carrying my invention into practice, I provide a bracket or attaching member 1, herein shown in the form of a pair of superposed and spaced bars or plates 2 and 3 held connected and spaced by distance pieces 4. These bars are arranged to provide in advance of the foremost distance piece 4 a space or opening 5 to receive a supporting or connecting element 6, including in the present instance a supporting or draft chain or connection 7. The ring or connection 6 is adapted to be secured in position upon the member 1 by a locking bolt 8 movable through a guide opening 9 in the bar or plate 2 and having a beveled end portion 10 to engage a keeper recess or opening 11 in the other bar or plate 3, whereby the locking end of the pin or bolt is adapted to extend across the space 5 and hold the element 6 from disconnection.

The opposite end of the locking pin or bolt is movable in and through a guide frame 12 attached to the bar 2 and may be provided with one or more openings 13 to receive a stop pin 14 to limit its locking or projecting movement. Inclosed within the frame 12 and surrounding the bolt between the outer end of said frame and an abutment 15 on the bolt is a coiled spring 16 which exerts its expansion energy to normally hold the bolt projected. When the element 6 is disposed in position and engaged by the bolt it will accordingly be held securely in position against any possibility of disconnection, the device thus serving in the present illustration as a means for connecting one element through the bracket 1 with another element through the chain or other connection 7.

In practice, the bracket 1 may be suitably attached to the shaft of a vehicle, and the element 7 may be attached to the holdback strap or other equivalent part of the harness of a draft animal, by means of which the harness will be fastened to the vehicle, it being understood that one of the devices will be employed for attaching each hold-back strap to a shaft and for attaching a swingletree to the draft gear, or that like devices may be employed for connecting tugs or traces, and a neck yoke, if desired, to the swingletrees and tongue of a vehicle. The device may also be employed for connecting a parachute with an aeroplane or other aerial vehicle, or for connecting any element with another where a secure fastening and rapid release are found desirable to guard against impending danger.

For the purpose of securing the bracket 1 to the vehicle shaft, or other part to which it is to be applied, holes 16' may be provided in the bar 3 for the passage of bolts or other suitable fastenings.

An operating mechanism is provided for manual or automatic releasing of the locking bolt. This comprises a lever 17 composed of a pair of spaced parallel lever arms 18 fulcrumed by a bolt 19 at their lower ends to a bearing lug 20 on the bar or plate 2. Also fulcrumed at their rear ends to the bolt 19 are lifting links 21 which are provided at their forward ends with longitudinal slots 22 slidably and pivotally engaging the ends of the abutment member 15, which is shown in the present instance as a transverse pin passing through the bolt.

These lifting links are connected at their forward ends by means of bolts 23 with the lower and forward ends of inclined actuating links 24 which are connected at their upper and rear ends by bolts 25 to the lever arm 17 at points well above the pivotal connection 19. A chain, rope or other element 26 extends from the lever 17 to any distant point whereby the lever may be operated.

It will be seen from the foregoing description that with the parts arranged in normal locking position, as shown in Fig. 1, the bolt will be held normally projected in a secure manner by the spring, but that by pulling backwardly on the lever 17 through the connection 26 the levers 24 will be operated to pull upward on the levers 21, by means of which a strong leverage will be secured and the levers 21 swung upwardly to lift or retract the bolt, said levers sliding upon the pin 15 in such operation to compensate for the differences between the arc of movement of the levers and straight line movement of the bolt, hence this construction will allow of the use of a powerful spring for holding the parts connected, inasmuch as the leverage gained by the described construction and arrangement of operating devices will enable the power of the spring to be overcome and the bolt retracted to positively and quickly release the bolt when desired.

I claim:—

In a holding and releasing device, a bracket including a pair of parallel bars, spacing connections between said bars, a bolt movable across the opening between the bars for engagement with one bar and extending through the other bar, a casing upon the second-named bar inclosing one end of the bolt, a spring disposed in said casing, a pin projecting transversely through the bolt and acted upon by said spring for normally holding the bolt projected, a bell crank lever pivoted at the angle of intersection of its arms and having one of its arms provided with a slot slidably and pivotally receiving said pin, a bracing member connecting the arms of said lever, and an operating element connected with the other arm of the lever.

In testimony whereof I affix my signature in presence of two subscribing witnesses.

MANUEL V. PENA.

Attest:
S. I. McKee,
A. U. Knaggs.